United States Patent [19]

Kamber

[11] 3,875,136

[45] Apr. 1, 1975

[54] PROCESS FOR THE MANUFACTURE OF PEPTIDES CONTAINING CYSTINE

[75] Inventor: Bruno Kamber, Basel, Switzerland

[73] Assignee: Ciba-Geigy Corporation, Ardsley, N.Y.

[22] Filed: June 9, 1972

[21] Appl. No.: 261,299

[30] Foreign Application Priority Data
July 7, 1971   Switzerland.......................... 9959/71
Mar. 6, 1972   Switzerland.......................... 3231/72

[52] U.S. Cl........ 260/112.5, 260/534 S, 260/481 R, 260/482 R
[51] Int. Cl....................... C07c 103/54, C08h 1/00
[58] Field of Search.......... 260/112.5, 481 R, 482 R

[56] References Cited
UNITED STATES PATENTS

| | | |
|---|---|---|
| 3,361,733 | 2/1968 | Okamura et al................. 260/112.5 |
| 3,446,789 | 5/1969 | Rudinger et al................. 260/112.5 |
| 3,560,521 | 2/1971 | Milkowski et al............... 260/112.5 |
| 3,679,655 | 7/1972 | Jager et al....................... 260/112.5 |

OTHER PUBLICATIONS

Brois et al., J. Am. Chem. Soc., 92, 7629–31 (1970).
Hiskey et al., J. Org. Chem. 35, 1118 (1970).

*Primary Examiner*—Lewis Gotts
*Assistant Examiner*—Reginald J. Suyat
*Attorney, Agent, or Firm*—Joseph G. Kolodny; John J. Maitner; Theodore O. Groegory

[57] ABSTRACT

Process for the manufacture of cystine-peptides wherein a cysteine peptide whose mercapto group is substituted by trityl or acylamidomethyl is reacted with $Hal—S—CO—OR_3$ wherein $R_3$ represents an optionally substituted hydrocarbon residue and that the resulting $—S—COOR_3$—protected cysteine peptide is reacted with a cysteine peptide with free mercapto group to yield the corresponding cystine peptide.

5 Claims, No Drawings

PROCESS FOR THE MANUFACTURE OF PEPTIDES CONTAINING CYSTINE

The subject of the invention is a new process for the manufacture of peptides containing cystine.

Cystine can be incorporated into peptides or proteins in two ways: in cyclic cystine peptides the disulphide bridge the cystine forms a ring with the backbone of the peptide chain (or a part thereof); in open-chain cystine-peptides, it links two chains which are otherwise separate from one another. Examples of naturally occurring cyclic cystine-peptides are oxytocin, vasopressin, growth hormone, calcitonin and proinsulin. Open-chain cystine-peptides are, for example, oxidised glutathion and insulin.

The present invention relates above all to the manufacture of open-chain asymmetrical cystine-peptides, that is to say of peptides in which two different peptide chains are joined to one another by a cystine bridge. In the process, the aminoacid configuration present in the starting materials is not changed.

According to known processes, cystine-peptides can be manufactured if in the two aminoacid sequence which contain cystein radicals and which are to be joined, and in which the mercapto groups are protected, for example by carbobenzoxy or benzyl groups or by the trityl group, the mercapto protective group is split off, benzyl for example by means of sodium in liquid ammonia and trityl, for example, by means of mercuric acetate and hydrogen sulphide or by means of 10 N hydrochloric acid, and the two peptides containing the free mercapto groups are then oxidised to give the disulphide, for example by means of 1,2-diiodoethane or by means of oxygen (air). This process has the disadvantage that in addition to the desired mixed cystine-peptide the two symmetrical cystine-peptides are in each case also formed.

Processes are also known in which the mixed disulphide is formed deliberately. Thus, the thiol side chain of the cysteine of one of the components to be joined can be converted into the S-sulphonic acid (Bunte salt) and this can be reacted with the second component (possessing the cysteine chain as a free thiol) to form the mixed disulphide. In another process, the thiol of the cysteine of the one chain is first converted into the S-thiocyanate and this is reacted with the second cysteine chain. In a further process, cystine-monosulphoxide-peptides are reacted with cysteine-peptides.

These processes are involved to carry out and in the case of insensitive peptides lead to side-reactions and correspondingly impair the yield.

It is known that mixed disulphides are formed in the reaction of sulphenylthiocarbonates with thiols [J. Amer. Chem. Soc. 92, 7629 (1971)].

It has now been found that cysteine or cysteine-peptides or their derivatives, in which the mercapto group is protected by a trityl or acylamidomethyl group, can be reacted with sulphenyl halides of the formula I Hal—S—CO—OR$_3$, wherein Hal represents a halogen atom and R$_3$ represents an optionally substituted hydrocarbon radical, to give sulsphenylthiocarbonates, without it being necessary to split off the mercapto protective groups beforehand. This reaction can be illustrated by the following equation (1):

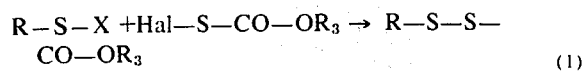

The reaction according to the invention has the particular advantage over the reaction known from J. Am. Chem. Soc., l.c., that solely the corresponding sulphenylthicarbonate is produced as the end product from the cystseine-peptide I, whilst in the known reaction the sulphenylthiocarbonate can partly react further with the thiol Ia employed, which has a free SH group, to form the symmetrical disulphide in accordance with the following equation (2):

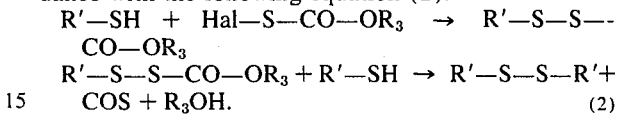

In the equation (1), X denotes the trityl group (Trt) or an acylamidomethyl group (acylm), for example a group as described in U.S. patent application, Ser. No. 96,556, filed Dec. 9, 1970, now U.S. Pat. No. 3,794,633. Acylamidomethyl is, for example, a group of the formula —CH$_2$—NH—CO—R$_4$, wherein CO—R$_4$ denotes the acyl radical of a carboxylic acid, such as of an aliphatic, aromatic, araliphatic or heterocyclic carboxylic acid or of a carbonic acid derivative, such as a carbonic acid ester radical or carbamic acid radical. Above all, R$_4$ is an optionally substituted lower alkyl radical, for example methyl, ethyl, propyl, isopropyl, n-butyl or tert.butyl radical, which can, for example, contain chlorine, trifluoromethyl or the nitro group as substituents. Further, R$_4$ is, for example, an optionally substituted cycloalkyl radical with 3–8, preferably 5–6, ring atoms, such as the cyclopentyl or cyclohexyl radical, or an optionally substituted aromatic or araliphatic radical, wherein the aromatic ring is preferably the benzene ring, above all optionally substituted phenyl or benzyl, for example unsubstituted phenyl or benzyl, or phenyl or benzyl substituted in the phenyl radical by lower alkyl, lower alkoxy, halogen or nitro, or a preferably monocyclic heterocyclyl radical, for example a thienyl or furyl radical, which is optionally substituted as mentioned. "Hal" denotes a halogen atom with an atomic weight of at most 80, such as fluorine and bromine, above all chlorine. R$_3$ represents an optionally substituted hydrocarbon radical with at most 18 carbon atoms, as described in German Offenlegungsschrift No. 1,568,632, for example unsubstituted alkyl with 1–18, preferably 1–6 carbon atoms, or such an alkyl substituted by chlorine atoms or lower alkoxy groups, such as ethyl, propyl, n-butyl, n-octyl, n-octadecyl and above all methyl, and also 2-chloroethyl, 2-methoxyethyl, cycloalkyl such as cyclopentyl or cyclohexyl, or aralkyl, for example phenyl-lower alkyl, such as benzyl or 2-phenylethyl.

R represents the radical of cysteine or of a cysteine-peptide or of a derivative thereof. By cysteine-peptides there are to be understood peptides which contain a cysteine radical and optionally additionally one or more cysteine radicals. Peptides are above all naturally occurring peptides and synthetic analogues thereof, as well as part-sequences of such peptides. These peptides are built up of naturally occurring aminoacids, above all of the 20 code-aminoacids, and also of their homologues, structural isomers and optical isomers; for example, in addition to the code-aminoacids and their optical isomers, the peptides can contain amino-lower alkanoic acids with 3–7 carbon atoms, such as β-alanine, α-aminobutyric acid, γ-aminobutyric acid, α,β-diaminopropionic acid, norvaline, norleucine and also, for example, hydroxyproline, normethionine, phenylglycine, ornithine, citrulline or N-alkyl-aminoacids such as N-methyltyrosine or corresponding D-compounds.

Derivatives of peptides are, for example, amides, such as C-terminal N-unsubstituted or n-substituted amides, for example N-monoalkyl- or N-aminoalkyl-substituted C-terminal amides wherein alkyl possesses 1-18 carbon atoms, and also C-terminal esters, for example alklyl esters, wherein alkyl possesses 1-18 carbon atoms, as well as N-α-substitution products, above all N-α-acyl derivatives, wherein acyl is a radical with 1-18 carbon atoms, and, finally, intermediate products which are customary in the synthesis of peptides, such as peptides having an activated amino or carboxyl group, for example activated esters, hydrazides, azides, mixed anhydrides and corresponding compounds in which functional groups such as amino, carboxyl, hydroxyl, mercapto and/or guanidino groups are blocked in a known manner by protective groups.

It has furthermore been found that a cysteine or cysteine-peptide or derivative thereof, which is substituted by the group $-S-COOR_3$, can be reacted with peptide containing cysteine or a derivative thereof, the mercapto group of this cysteine component being present in the free form, to give the corresponding cystine compound. The subject of the invention is therefore a process for the manufacture of cystine-peptides or their derivatives, which is characterised in that cysteine or cysteine-peptides or their derivatives, in which the mercapto group is substituted by a trityl or acylamidomethyl group, are reacted with a sulphenyl halide of the formula I $Hal-S-CO-OR_3$, wherein Hal represents a halogen atom and $R_3$ represents an optionally substituted hydrocarbon radical, and that a cysteine compound protected by the $-SCOOR_3$ group is reacted with cysteine or a peptide containing cysteine or a derivative thereof, having a free mercapto group, to give the corresponding cystine compound.

The process has the advantage that cysteine or cysteine-peptides or derivatives thereof which are protected by trityl or acylamidomethyl can be selectively converted into a cysteine-peptide without the mercapto protective group having to be split off beforehand and that no interfering by-products, for example acids, are formed.

In the process described here it is not necessary that the $-SCOOR_3$ group should be introduced into the first cysteine component (S-trityl-substituted or S-acylamidomethyl-substituted) immediately before the further reaction with a second cysteine component. Rather, it can be introduced, like customary protective groups, into the cysteine derivatives by means of the reaction described at an earlier stage of the peptide synthesis, and the resulting derivative can be used for further peptide synthesis steps. At any desired point of the synthesis, a $SCOOR_3$—protected cysteine compound can be reacted with a cysteine compound possessing a free mercapto group.

As amino protective groups there should for example be mentioned benzyl, trifluoromethyl, phthaloyl, p-toluenesulphonyl, trityl or, above all, groups derived from carbonic acid, such as benzyloxycarbonyl groups which are optionally substituted in the aromatic radical by halogen atoms, lower alkyl or lower alkoxy or lower carbalkoxy groups, coloured benzyloxycarbonyl groups, such as p-phenylazo-benzyloxycarbonyl and p-(p'-methoxy-phenylazo)-benzyloxycarbonyl, tolyloxycarbonyl, 2-phenyl-isopropoxycarbonyl, 2-tolyl-isopropoxycarbonyl and above all 2-p-(biphenylyl)-2-propoxycarbonyl (compared French Patent No. 1,554,051), and also aliphatic oxycarbonyl groups such as, for example, allyloxycarbonyl, cyclopentyloxycarbonyl, tert.amyloxycarbonyl, adamantyloxycarbonyl and above all tert.butoxycarbonyl.

The reaction can also be carried out if the amino groups are present in the form of salts, for example as hydrochlorides.

The carboxyl groups can be protected by, for example, amidation or esterification. As esters there should be mentioned, for example, those of methanol, ethanol, benzyl alcohol, p-methoxybenzyl alcohol, 2,4,5-trichlorophenol, n-hydroxysuccinimide and N-hydroxyphthalimide, or above all of tert.butanol or silanol, for example trimethylsilanol. Hydroxyl groups, for example of serine or tyrosine radicals, can be protected, for example by etherification, for example with benzyl alcohol or preferably with tert.butanol. In arginine radicals, the guanidino group can, for example, be protected by the tosyl group. The disulphide-peptides obtained in the present process and possessing protective groups can be used directly for the synthesis of peptides having a longer aminoacid chain or, if desired, the protective groups can be split off in a known manner, for example with acids.

The reaction can also be carried out if the carboxyl groups are present as salts, for example as salts with alkali metals, ammonia or organic nitrogen bases, for example ethanolamine, diethylamine, triethylamine, tributylamine, pyridine and pyrrolidine.

The following solvents, for example, can be used for the manufacture of the sulphenylthiocarbonate derivative: hydrocarbons such as petroleum ether, hexane, benzene and toluene: chlorinated hydrocarbons such as methylene chloride, chloroform and dichloroethane; alcohols such as methanol, and ethanol, ethers such as diethyl ether and tetrahydrofurane, and amides such as dimethylformamide. The addition of an acceptor for the hydrogen halide produced in the reaction, for example triethylamine, is not necessary, but can be desirable if groups which are very labile to acids are present in the peptide derivative. The reaction takes place at temperatures of approx. $-40°$ to $30\ 60°C$ but is preferably carried out at $0°$.

In the reaction of the sulphenylthiocarbonate derivative with the thiol component, glacial acetic acid as well as aqueous acetic acid can also be used apart from the abovementioned solvents. The reaction can be carried out at the temperatures mentioned, preferably at room temperature.

The invention is described in the examples which follow. The Rf values relate to thin layer chromatography on silica gel plates;

System 100 = ethyl acetate-n-butanol-pyridine-glacial acetic acid-water (42:21:21:6:10).

The following abbreviations are used:

| | | |
|---|---|---|
| OMe | = | Methyl ester |
| OtBu | = | tert.Butyl ester |
| OSu | = | N-Hydroxysuccinimide ester |
| BOC | = | tert.Butyloxycarbonyl |
| Trt | = | Trityl |

| Bpoc | = | 2-(p-Biphenylyl)-2-propoxycarbonyl |
| Acm | = | Acetylaminomethyl |
| SCM | = | Methoxycarbonylsulphenyl (—S—CO—OCH₃) |
| DCHA | = | Dicyclohexylammonium salt |

The examples show the manufacture of protected fragments of insulin in the region of the disulphide bridge $A_{20} - B_{19}$.

EXAMPLE 1

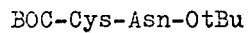
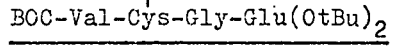

1. BOC—Cys(SCM)—Asn—OtBu a. From BOC—Cys(Trt)—Asn—OtBu.

3.2 g of BOC—Cys(Trt)—Asn—OtBu in 15 ml of CHCl₃ and 5 ml of MeOH are added to 700 mg of Cl—S—CO—OCH₃ in 2 ml of CHCl₃ at 0°C. After 45 minutes at 0°C, 150 ml of CHCl₃ are added and the solution is extracted with water. The solution is dried over sodium sulphate and evaporated in a water pump vacuum. The oil thereby produced is a mixture of BOC—Cys(SCM)—Asn—OtBu and triphenylmethyl-methyl-ether. The latter does not have to be separated off since it does not cause any side-reactions in the subsequent reaction.

b. From BOC—Cys(Acm)—Asn—OtBu 700 mg of Cl—S—CO—OCH₃ and 2.32 g of BOC—Cys(Acm)—Asn—OtBu are reacted as described under (a), and worked up analogously. 2.4 g of BOC—Cys(SCM)—-Asn—OtBu, which is chromatographically pure, result. Rf = 0.4 in chloroform-methanol (9:1).

The starting material can be manufactured as follows:

585 mg of BOC—Cys(Acm)—OH and 377 mg of H—Asn—OtBu in 10 ml of ethyl acetate and 5 ml of dimethylformamide are treated at 0°C with 452 mg of dicyclohexylcarbodiimide and the mixture is left to react for 24 hours at this temperature. It is filtered, the filtrate is evaporated to dryness, the residue is taken up in ethyl acetate and the solution is washed with 1 N citric acid, 1 N sodium bicarbonate and water. The organic phase is dried with sodium sulphate and evaporated. Crystallization from ethyl acetate and n-hexane yields BOC—Cys(Acm)—Asn—OtBu of melting point 97°-100°C.

2. 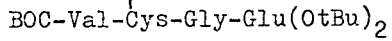

1.45 g of BOC—Cys(SCM)—Asn—OtBu and 1.85 g of BOC—Val—Cys—Gly—Glu(OtBu)₂ are dissolved in 30 ml of CHCl₃—MeOH (1:1) and the solution is kept for 45 minutes at room temperature. It is then evaporated in a water pump vacuum at 35°C and the resulting foam is twice triturated with 5 ml of petroleum ether at a time. 3.0 g of a product of the above formula, which is pure according to thin layer chromatography, are obtained as a colourless powder. Rf = 0.47 in chloroform-methanol (9:1).

The BOC—Val—Cys—Gly—Glu(OtBu)₂ used as the starting material can be manufactured as follows:

700 mg of mercury-(II) acetate are added to 1.72 of BOC—Val—Cys(Trt)—Gly—Glu(OtBu)₂ in 20 ml of ethyl acetate and 10 ml of methanol and the mixture is left to stand for 3 hours at room temperature. A stream of H₂S is then passed through the clear solution for 15 minutes, the mercury sulphide which has separated out is filtered off and the filtrate is evaporated. The resulting foam consists of BOC—Val—Cys—Gly—Glu(OtBu)₂ [Rf = 0.55 in chloroform-methanol (1:1)] and triphenylmethyl-methyl-ether. The latter does not interfere with the subsequent reaction.

EXAMPLE 2

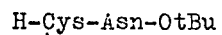
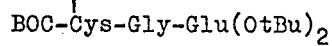 

1. H—Cys(SCM)—Asn—OtBu.HCl a. From H—Cys(Trt)—Asn—OtBu—HCl 1.82 g of H—Cys(Trt)—Asn—OtBu.HCl in 15 ml of methanol are added at 0°C to 670 mg of Cl—S—CO—OCH₃ in 10 ml of methanol. After 45 minutes at 0°C the mixture is precipitated with 250 ml of ether and decanted, and the residue is dried in water pump vacuum at 35°C. 1.2 g of H—Cys(SCM)—Asn—OtBu.HCl, which is pure according to thin layer chromatography, are obtained as yellowish powder. RF — 0.32 in chloroform-methanol (8:2).

The starting material can be manufactured as follows:

7.76 g of Trt—Cys(Trt)—Asn—OtBu in 60 ml of glacial acetic acid and 15 ml of water are left to stand for 1 hour at room temperature. 45 ml of water are then added, the triphenylcarbinol which has separated out is filtered off and the mixture is evaporated at 40°C and 0.01 mm Hg. The residue is taken up in 200 ml of ethyl acetate and the solution is extracted with 1 N bicarbonate and with water. The ethyl acetate phase is dried over sodium sulphate and concentrated to approx. 30 ml in a water pump vacuum, 10 ml of 1 N HCl in ethyl acetate are added and the mixture is then completely evaporated to dryness. 5.7 g of H—Cys—(Trt)—Asn—OtBu.HCl, which is pure according to thin layer chromatography, result. RF = 0.55 in chloroform-methanol (8:2).

b. From H—Cys(Acm)—Asn—OtBu.HCl 1.5 g of H—Cys(SCM)—Asn—OtBu.HCl are obtained fromm 1.6 g of H—Cys(Acm)—Asn—OtBu.HCl and 790 mg of Cl—S—CO—OCH₃ as described under (a).

The starting material can be manufactured as follows:

a. Trt—Cys—(Acm)—OH 4.2 g of trityl chloride in 20 ml of dimethylformamide are added to a solution of 2.3 g of H—Cys(Acm)—OH and 2.8 ml of triethylamine in 50 ml of dimethylformamide and the mixture is stirred for 24 hours at room temperature. It is then concentrated to approx. 10 ml and taken up in 100 ml of ethyl acetate and 50 ml of water, and the mixture is adjusted to pH 3 with 1 N citric acid. The ethyl acetate phase is washed with water, dried over sodium sulphate and evaporated. Crystallisation from chloroform-petroleum ether yhields Trt-Cys(Acm)—OH of melting point 143°-145°C.

β. Trt-Cys(Asn—OtBu 2.17 g of Trt—Cys(Acm)—OH and 0.9 g of H—Asn—OtBu are dissolved in 30 ml of dimethylformamide and 1.1 g of dicyclohexylcarbodiimide are added at 0°C. After 15 hours at 5°C, the mixture is filtered, the filtrate is evaporated at 35°C and 0.01 mm Hg, the residue is taken up in 200 ml of ethyl acetate and the solution is washed with half-saturated sodium chloride solution. After drying over sodium sulphate, it is evaporated and the resulting product is reprecipitated from ethyl acetate-hexane. Rf = 0.25 in chloroform-methanol (49:1).

γ. H—Cys(Acm)—Asn—OtBu.HCl 2.5 g of Trt—Cys(Acm)—OtBu in 25 ml of 80% strength acetic acid are de-tritylated, and worked up, as described under (1a). 1.85 g of pure H—Cys-(Acm)—Asn—OtBu.HCl result. Rf = 0.30 in chloroform-methanol (8:2).

2.  H-Cys-Asn-OtBu.HCl
    |
    BOC-Cys-Gly-Glu(OtBu)$_2$ 1.25 g of H—Cys(SCM)—Asn—OtBu.HCl and 1.56 g of BOC13 Cys—Gly—Glu(OtBu)₂ in 30 ml of chloroform-methanol (1:1) are left to stand for 1 hour at room temperature. The clear solution is then evaporated at 35°C in a water pump vacuum and the residue is twice triturated with 5 ml of petroleum ether at a time. The product, which is pure according to thin layer chromatography, is obtained as a colourless powder. Yield 2.45 g. Rf = 0.50 in chloroform-methanol (8:2).

The product can, for example, be used as follows for the peptide synthesis:

BOC-Tyr-Cys-Asn-OtBu
|
BOC-Cys-Gly-Glu(OtBu)$_2$ 2.2 ml of 1 N triethylamine in tetrahydrofurane and 2.2 ml of 1 N isobutylchlorocarbonate in tetrahydrofurane are added to 620 mg of BOC—Tyr—OH in 10 ml of tetrahydrofurane at −15°C. After 10 minutes −10°C, 1.69 g of H-Cys-Asn-OtBu.HCl
|
BOC-Cys-Gly-Glu(OtBu)$_2$ and 0.28 ml of triethylamine in 15 ml of tetrahydrofurane are added and the mixture is left to stand for 1 hour at −10°C and 15 hours at room temperature. The solution is filtered, the filtrate is evaporated, the residue is taken up in 200 ml of ethyl acetate and the solution is washed with 0.1 N citric acid, 0.1 N sodium bicarbonate and water. After drying over sodium sulsphate, the solution is evaporated and the residue is reprecipitated from ethyl acetate-hexane. 1.9 g of pure product of the above formula result. Rf = 0.46 in chloroform-methanol (9:1).

EXAMPLE 3

H-Cys-Asn-OtBu
|                           .HCl
Bpoc-Leu-Val-Cys-Gly-Glu(OtBu)$_2$ 0.83 g of H—Cys(SCM)—Asn—OtBu.HCl and 1.70 g of Bpoc—Leu—Val—Cys—Gly—Glu(OtBu)₂ are dissolved in 20 ml of chloroform-methanol (1:1) and after 1 hour the solution is evaporated at 20°C. The residue is reprecipitated from methanol-ether. Rf = 0.45 in chloroform-methanol (8:2).

The starting material can be manufactured as follows:

a. Bpoc—Leu—Val—OMe 36.9 g of Bpoc—Leu—OH and 13.9 ml of triethylamine in 300 ml of acetonitrile are treated with 13.3 ml of isobutyl chlorocarbonate at −10°C. After 10 minutes at −10°C, 16.8 g of HCl.H—Val—OMe and b 13.9 ml of triethylamine in 170 ml of acetonitrile are added and the mixture is left to stand for 1 hour at −10°C and 10 hours at room temperature. It is then filtered, the filtrate is evaporated, the residue is taken up in ethyl acetate and the solution is washed with dilute citric acid, 0.5 N sodium bicarbonate and water. After drying over sodium sulphate, it is evaporated and residue is reprecipitated from ethyl acetate-hexane. Rf = 0.45 in ethyl acetate-hexane (1:1).

b. Bpoc—Leu—Val—OH 39 g of Bpoc—Leu—Val—OMe are dissolved in 400 ml of dioxane, 100 ml of water and 130 ml of 1 N NaOH are added and the mixture is left to stand for 1 hour at 20°C. The dioxane is then largely evaporated off in a rotary evaporator at 30°C, 300 ml of ice water and 300 ml of chloroform are added and the mixture is treated with 130 ml of 1 N HCl at 0°C, whilst stirring. The chloroform solution is separated off and washed three times with half-saturated sodium chloride solution. After drying over sodium sulphate and evaporating off the solvent, Bpoc—Leu—Val—OH is obtained in a form which is pure according to thin layer chromatography. Rf = 0.40 in chloroform-methanol (7:3).

c. Bpoc—Leu—Val—Cys(Trt)—Gly—Glu(OtBu)₂

2.47 g of dicyclohexykarbodiimide and 1.6 g of 1 hydroxybenzotriazole are added to 4.5 g of Bpoc—Leu—Val—Oh and 6.6 g of H—Cys(Trt)—Gly—Glu(OtBu)₂ in 100 ml of dimethyl formamide at 0°C. After 1 hour at 0°C and 15 hours at 20°C, the mixture is filtered and the filtrate is evaporated at 40°C and 0.01 mm Hg. The residue is taken up in ethyl acetate and the solution is washed with 0.5 N citric acid, 0.5 N bicarbonate and water. After drying over sodium sulphate, it is evaporated and the residue is reprecipitated from ethyl acetate-hexane. Rf = 0.55 in chloroform-methanol (19:1).

d. Bpoc—Leu—Val—Cys—Gly—Glu(OtBu)₂

0.7 g of mercury-(II) acetate is added to 2.2 g of Bpoc—Leu—Val—Cys(Trt)—Gly—Glu(OtBu)₂ in 15 ml of ethyl acetate and 7 ml of methanol and the mixture is left to stand for 4 hours at 20°C. A stream of hydrogen sulphide is then passed through it for 15 minutes, the mixture is filtered and the filtrate is evaporated.

The product can be used as follows for the synthesis of

BOC-Tyr-Cys-Asn-OtBu
|
BOC-Val-Gln(OtBu)-Ala-Leu-Tyr-Leu-Val-Cys-Gly-Glu(OtBu)$_2$ a)   BOC-Tyr-Cys-Asn-OtBu
     |
     Bpoc-Leu-Val-Cys-Gly-Glu-(OtBu)$_2$ 1.3 ml of 1 N isobutyl chlorocarbonate in tetrahydrofurane are added to 340 mg of BOC—Tyr—OH in 5 ml of absolute tetrahydrofurane at −10°C. After 15 minutes at −10°C, 1.18 g of

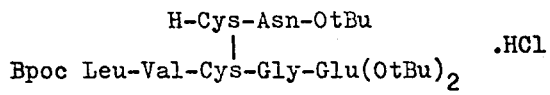

and 1.0 ml of 1 N triethylamine/tetrahydrofurane in 15 ml of tetrahydrofurane are added. After 1 hour at −10°C and 15 hours at 20°C, the mixture is filtered, the filtrate is evaporated and the residue is reprecipitated from chloroformether. RF = 0.35 in chloroform-methanol (9:1).

β) H-BOC-Tyr-Cys-Asn-OtBu

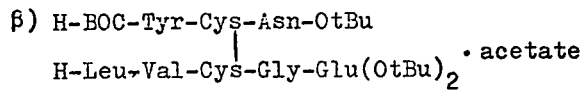

1.5 g of the product described under (α) are taken up in 12 ml of glacial acetic acid and 3 ml of water and the solution is kept for 1 hour at 45°C. 10 ml of glacial acetic acid are then added and the mixture is lyophilised. The resulting powder is twice triturated with 5 ml of petroleum ether at a time. Rf = 0.40 in chloroform-methanol (8:2).

γ)

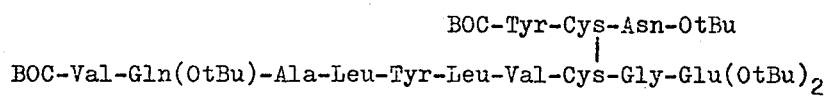

0.46 g of BOC—Val—Glu(OtBu)—Ala—Leu—Tyr—NH—NH$_2$ in 5 ml of dimethylformamide are treatd, at −10°C, with 0.75 ml of 2 N HCl in ethyl acetate and 0.72 ml of 1 N tert.butylnitrite in ethyl acetate. After 15 minutes at −10°C, a solution of 0.60 g of the product described under (β) and 2 ml of 1 N triethylamine/ethyl acetate in 7 ml of dimethylformamide are added. After 1 hour at −10°C and 15 hours at 20°C, the solution is added dropwise onto 100 ml of stirred water and filtered, and the precipitate is purified by reprecipitation from methanol-ether. Rf = 0.35 in chloroform-methanol (8:2).

EXAMPLE 4

BOC-Tyr-Cys-Asn-OtBu

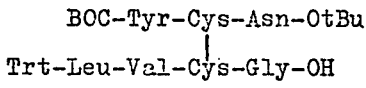

1. Trt—Leu—Val—Cys(SCM)—Gly—OH

A solution of 4.3 g of Trt—Leu—Val—Cys(Trt)—Gly—OH and 0.515 ml of diethylamine in 35 ml of chloroform and 15 ml of methanol is treated with 0.88 ml of Cl—S—CO—OCH$_3$ at −10°C. After 15 minutes at −10°C, 0.6 ml of diethylamine are added, the cooling is removed and after 5 minutes the mixture is diluted with 150 ml of chloroform. The solution is washed with dilute citric acid and water, dried over sodium sulphate and then concentrated to approx. 10 ml. Trt—Leu—Val—Cys(SCM)—Gly—OH is precipitated by adding petroleum ether. It is recrystallised from chloroform-petroleum ether; melting pint 195°–200°C (decomposition).

The Trt—Leu—Val—Cys(Trt)—Gl—OH used as the starting material can be manufactured as follows:
Trt—Cys(Trt)—Gly—OMe 56.24 g of Trt—Cys(Trt)—OSu and 8.01 g of Gly—OMe are dissolved in 150 ml of chloroform. After 15 hours at 20°C the solution is evaporated, the residue is taken up in 500 ml of ethyl acetate and this solution is washed with dilute citric acid and with water. After drying over sodium sulphate, the solvent is evaporated off and the residue is purified by reprecipitation from ethyl acetate-n-hexane. Rf = 0.70 in chloroform-methanol (95:5).

H—Cys(Trt)—Gly—OMe 7.5 ml of water and 5.1 ml of 2.1 N hydrochloric acid are added dropwise to a solution of 6.8 g of Trt—Cys(Trt)—Gly—OMe in 75 ml of methanol. After 1 hour at 20°C, the solution is evaporated into approx. 20 ml and taken up in 150 ml of ethyl acetate, and this mixture is washed with 0.5 N sodium bicarbonate and water. The solution, dried over sodium sulphate, is evaporated and the residue is titurated with 20 ml of petroleum ether. An oil, which according to thin layer chromatography is a single substance, results. Rf = 0.50 in chloroform-methanol (96:5).

Trt—Leu—Val—Cys(Trt)—Gly—OMe 0.4 g of 1-hydroxybenzotriazole and 2.26 g of dicyclohexylcarbodiimide are added to 4.72 g of Trt—Leu—Val—OH and 4.35 g of H—Cys(Trt)—Gly—OMe in 50 ml of chloroform. After 15 hours at 20°C, the mixture is filtered, the filtrate is diluted with 50 ml of chloroform and the solution is washed with dilute citric acid, 0.5 N sodium bicarbonate and water. The solution is dried over sodium sulphate and evaporated and the residue is dissolved in 30 ml of chloroform-methanol (1:1), with warming. After addition of a few drops of ether, the product crystallises out. Melting point 252°–254°C.

Trt—Leu—Val—Cys(Trt)—Gly—Oh 7.12 g of Trt—Leu—Val—Cys(Trt)—Gly—OMe are dissolved in 80 ml of dioxane with warming. 4.5 ml of 2 N sodium hydroxide solution and 10 ml of water are then added dropwise at 20°C. After 50 minutes at 20°C, the solultion is concentrated to approx. 30 ml and 20 ml of 1 N citric acid and 100 ml of water are added, whilst stirring, at 0°C. The precipitate is filtered off, washed with cold water and dried with phosphorus pentoxide and sodium hydroxide. A white powder which is pure according to thin layer chromatography results. Rf = 0.60 in chloroform-methanol(1:1).

2.)

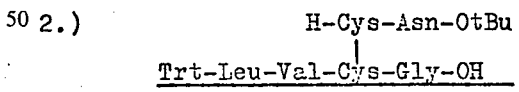

710 mg of Trt—Leu—Val—Cys(SCM)—Gly—OH and 330 mg of HCl.H—Cys—Asn—OtBu are dissolved in 5 ml of chloroform and 5 ml of methanol. After one hour at 20°C, the solution is evaporated and the residue is triturated with 10 ml of water at 0°C, and filtered off. The product, which is pure according to thin layer chromatography, is obtained as a colourless powder. Rf$_{100}$ = 0.3.

3.)

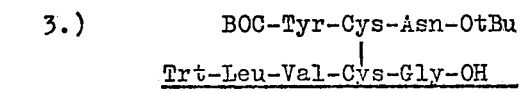

210 mg of BOC—Tyr—OH, 87 mg of N-hydroxysuccinimide and 0.094 ml of N-ethylmorpholine in 3 ml of dimethylformamide are treated with 155 mg of N-ethylmorpholine at −10°C. After 2 hours at 20°C, 680 mg of H-Cys-Asn-OtBu
|
Trt-Leu-Val-Cys-Gly-OH in 7 ml of dimethylformamide are added and the mixture is left to stand for 15 hours at 20°C. It is filtered and the filtrate is evaporated at 0.01 mm Hg and 35°C. Reprecipitation of the residue from chloroform-n-hexane yields the product mentioned under (3), which is pure according to thin layer chromatography. Rf = 0.40 in chloroform-methanol (7:3).

The starting material used under (2) can be manufactured as follows:

H—Cys(Trt)—Asn—OtBu.HCl 7.76 g of Trt—Cys(Trt)—Asn—OtBu are dissolved in 60 ml of glacial acetic acid and 15 ml of water are added dropwise. After 1 hour at 20°C, 45 ml of water are added, the mixture is filtered and the filtrate is evaporated. The residue is taken up in 150 ml of ethyl acetate and the solution is washed with 0.5 N sodium bicarbonate and water. After drying over sodium sulphate, the solvent is evaporated off, the residue is dissolved in 10 ml of ethyl acetate and 5 ml of 2 N hydrogen chloride in ethyl acetate and 150 ml of petroleum ether are added at 0°C. The precipitate is filtered off and rinsed with petroleum ether. A white powder which is a single substance according to thin layer chromatography results. Rf = 0.50 in chloroform-methanol (8:2).

H—Cys—Asn—OtBu. HCl 11.10 g of H—Cys(Trt)—Asn—OtBu. Hcl in 80 ml of methanol and 80 ml of ethyl acetate and 7.3 g of mercury(II) acetate are added. After 4 hours at 20°C, a stream of hydrogen sulphide is passed through the solution for 15 minutes, the mixture is filtered and the filtrate is evaporated. The residue is triturated three time with 20 ml of petroleum ether at a time, the insoluble viscous oil is dissolved in 20 ml of chloroform and the product is precipitated as a white powder by adding 110 ml of petroleum ether. Rf = 0.35 in chloroform-methanol (1:1).

EXAMPLE 5

BOC—Cys(SCM)—Asn—OtBu 634 mg of BOC—Cys(Trt)—Asn—OtBu in 6 ml of chloroform and 3 ml of methanol are treated with 0.18 ml of Cl—S—CO—OCH$_3$ at 0°C. After one hour at 0°C, 2.5 ml of 1 N diethylamine are added and the solution is washed with dilute citric acid and with water. After drying over sodium sulphate, the organic phase is concentrated and petroleum ether is added. The precipitate, BOC—Cys(SCM)—Asn—OtBu, is crystallised from chloroform petroleum ether. Melting point 102°–104°C.

EXAMPLE 6

BOC—Cys(SCM)—OH.rt)—OH.diethylammonium 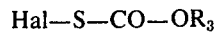 salt is 35 ml of chloroform and 9 ml of methanol, the solution is cooled to 0°C and 3.5 ml of Cl—S—CO—OCH$_3$ are added. After 1 hour at 0°C, the solution is washed with dilute citric acid and water and the organic phase is dried over sodium sulphate and evaporated. The resulting oil is twice triturated with petroleum ether, dissolved in 10 ml of ether and treated with 2.5 ml of dicyclohexylamine. Crystals of melting point 145°–146°C are obtained.

This compound can be converted as follows into the product described in Example 5:

725 mg of BOC—Cys(SCM)—OH.DCHA in 30 ml of chloroform are treated with dilute citric acid and water, and the organic phase is separated off, dried over sodium sulphate and evaporated to leave an oil. This is taken up in 10 ml of ethyl acetate and 190 mg of H—Asn''OtBu and 226 mg of dicyclohexylcarbodiimide are added at 0°C. After 15 hours at 5°C the mixture is filtered, the filtrate is diluted with 30 ml of ethyl acetate and the solution is washed with dilute citric acid, 0.5 N sodium bicarbonate and water. After drying the ethyl acetate solution over sodium sulphate and evaporating off the solvent, recrystallisation from chloroform-petroleum ether yields the product described in Example 5.

What we claim is:

1. In a process for the manufacture of disulfides by
   1. reaction of a thiol with a sulphenyl halide to form a sulphenylthiocarbonate followed by
   2. reaction of said sulphenylthiocarbonate with a thiol to form a disulfide, the improvement which comprises reacting, in the first step, a thiol in which the mercapto group is substituted by a trityl or acylamidomethyl group with a suslphenyl halide of the formula I $$\text{Hal—S—CO—OR}_3$$

wherein Hal is halogen and R$_3$ is alkyl, chloroalkyl or lower alkoxyalkyl, in which alkyl has 1–18 carbon atoms, cyclopentyl, cyclohexyl or phenyl-lower alkyl, said thiols used in the first and second step being cysteine or cysteine peptides or derivatives thereof.

2. Process according to claim 1, characterised in that the reaction is carried out with a sulphenyl halide of the formula I, wherein Hal denotes a chlorine atom.

3. Process according to claim 1, characterised in that the reaction is carried out with a sulphenyl halide of the formula I, wherein R$_3$ denotes a lower alkyl radical.

4. Process according to claim 1, characterised in that the reaction is carried out with methoxy carbonylsulphenyl chloride.

5. Process according to claim 1, characterised in that the reaction of a —SCOOR$_3$— protected cysteine compound with the second cysteine component, which possesses a free mercapto group, is carried out at any desired stage of peptide synthesis.

* * * * *